United States Patent [19]

Ram

[11] 3,723,605
[45] Mar. 27, 1973

[54] PROCESS FOR THE PRODUCTION OF A CONTINUOUS LENGTH OF GRAPHITIC FIBROUS MATERIAL

[75] Inventor: Michael J. Ram, West Orange, N.J.

[73] Assignee: Celanese Corporation, New York, N.Y.

[22] Filed: June 10, 1970

[21] Appl. No.: 45,161

[52] U.S. Cl.............................. 423/447, 423/448
[51] Int. Cl. ........................ C01b 31/04, C01b 31/07
[58] Field of Search............... 23/209.1, 209.5, 209.3; 264/29; 252/502; 117/46

[56] References Cited

UNITED STATES PATENTS

| | | | |
|---|---|---|---|
| 3,552,923 | 1/1971 | Carpenter et al. | 23/209.1 |
| 3,449,077 | 6/1969 | Stuetz | 23/209.1 |
| 3,294,489 | 12/1966 | Millington et al. | 23/209.1 X |
| 2,949,430 | 8/1960 | Jorgensen | 252/502 |
| 3,484,200 | 12/1969 | Johnson et al. | 23/209.5 |

FOREIGN PATENTS OR APPLICATIONS

| | | | |
|---|---|---|---|
| 1,130,304 | 10/1968 | Great Britain | 23/209.1 |

OTHER PUBLICATIONS

Allen et al., "Nature" Vol. 224, Nov. 15, 1969, pages 684 & 685.
Klein, "Chemistry and Physics of Carbon" Vol. 2, 1966, pages 225–227.

*Primary Examiner*—Edward J. Meros
*Attorney*—Thomas J. Morgan, Charles B. Barris and Kenneth E. Macklin

[57] ABSTRACT

An improved process is provided for the production of a continuous length of a graphitic fibrous material through the catalysis of the graphitization reaction. A continuous length of fibrous material capable of undergoing graphitization which is essentially free of boron at the time of its introduction is continuously passed through a heating zone containing an inert gaseous atmosphere having a maximum temperature of at least about 2,000°C. bounded by walls of graphitic carbon in intimate association with a boron compound capable of undergoing volatilization at a temperature below about 2,000°C. thereby enabling the volatilization of a catalytic quality of boron capable of catalyzing the graphitization of the fibrous material within the heating zone.

22 Claims, 1 Drawing Figure

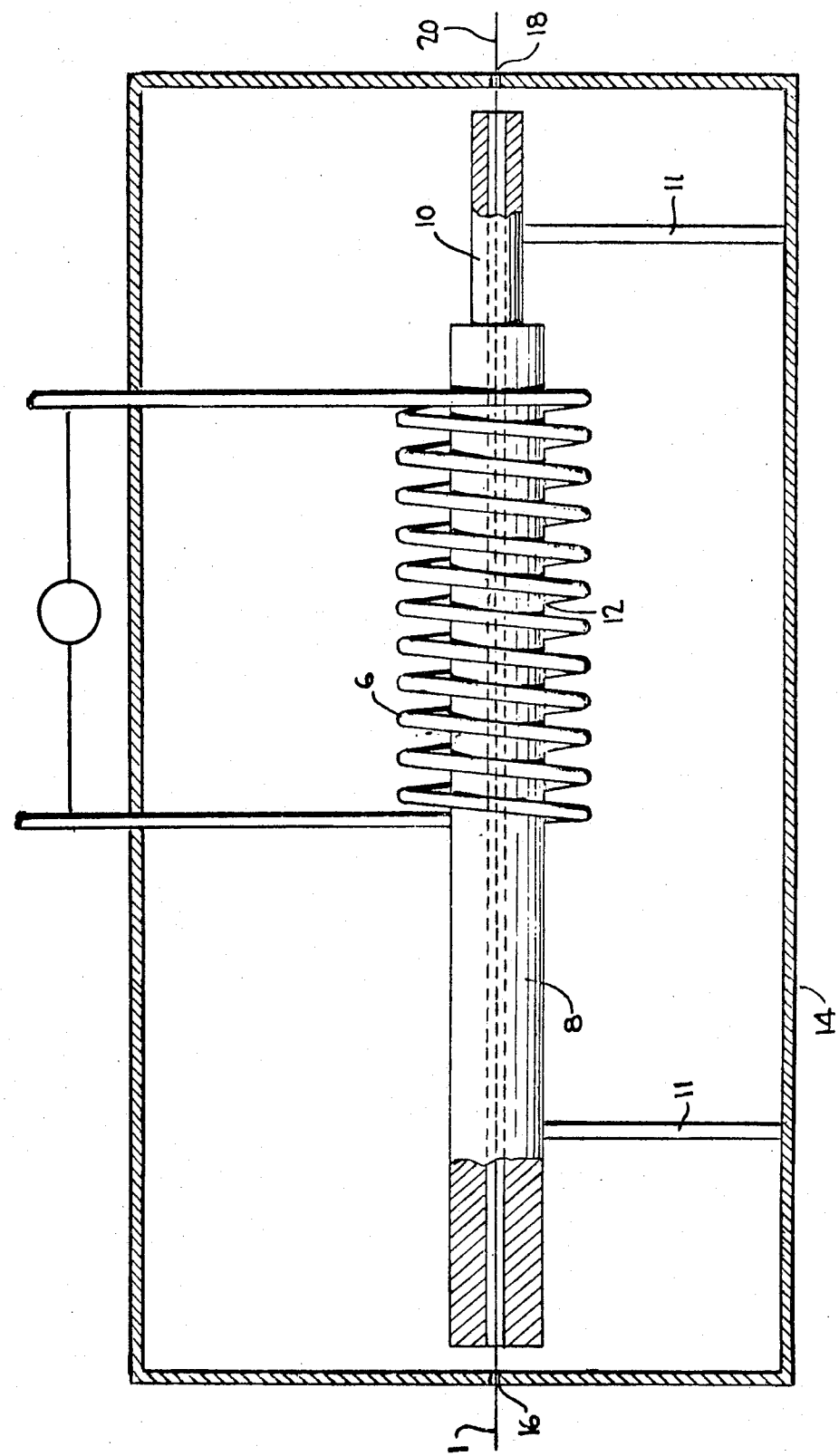

PROCESS FOR THE PRODUCTION OF A CONTINUOUS LENGTH OF GRAPHITIC FIBROUS MATERIAL

BACKGROUND OF THE INVENTION

Processes involving the boron catalyzed conversion of amorphous carbon to graphitic carbon have long been known. For instance, boron compounds such as boric acid have been incorporated in a mass of graphitizable carbon and the same baked to form massive graphite structures, such as graphite electrodes. Also, the pyrolytic codeposition of boron and carbon to form boron-containing pyrocarbons and boron pyrolytic graphite has been disclosed.

In the search for high performance materials, considerable interest has been focused upon graphitic fibrous materials. Graphite fibers are defined herein as fibers which consist essentially of carbon and have a predominant x-ray diffraction pattern characteristic of graphite. Amorphous carbon fibers or carbonized fibers, on the other hand, are defined as fibers capable of undergoing graphitization in which the bulk of the fiber weight can be attributed to carbon and which exhibit an essentially amorphous x-ray diffraction pattern. Graphite fibers generally have a much higher modulus and a higher tenacity than do amorphous carbon fibers and in addition are more highly electrically and thermally conductive.

Industrial high performance materials of the future are projected to make substantial utilization of fiber reinforced composites, and graphite fibers theoretically have among the best properties of any fiber for use as high strength reinforcement. Among these desirable properties are corrosion and high temperature resistance, low density, high tensile strength, and most important, high modulus. Graphite is one of the very few known materials whose tensile strength increases with temperature. Uses for such graphite fiber reinforced composites include aerospace structural components, rocket motor casings, deep-submergence vessels and ablative materials for heat shields on re-entry vehicles.

One of the major factors retarding the large-scale use of graphite fiber reinforced composites may be traced to the extreme costs commonly required for the production of high modulus graphite fibers suitable for use as reinforcement. Although the production of fibrous carbon by pyrolysis of hydrocarbon gases has been reported, this technique is generally not suitable for industrial applications requiring good quality control. Graphitization of amorphous carbon fibers derived from fibrous organic precursors appears to be the only practical industrial route available to form graphite fibers.

Many of the prior art methods for producing graphite fibers involve long processing periods, high power requirements, and/or expensive and bulky heating apparatus, such as closed furnaces. For instance, when graphite tube furnaces are utilized the graphite tubes are of limited life and must be periodically replaced. The processing and equipment costs required to produce graphite fibers commonly dwarf the fiber raw material costs.

Amorphous carbon fibers have been graphitized in the past by heating for extended periods of time, e.g. several hours, while present in a boron doped crucible. In an effort to expedite the graphitization of a fibrous material, a technique has heretofore been proposed in which the fibrous material undergoing graphitization is first soaked in an aqueous solution of boric acid, washed with water, and dried prior to graphitization. While such a technique has proven to be effective in catalyzing the graphitization of the fibrous material, it has proven to be unduly time consuming. For instance, it has proven to be essential to wash the fiber following soaking in the solution of boric acid so that an excessive quantity of the boron compound is not deposited upon the surface of the fibrous precursor upon drying. It is essential also that the fibrous material be dried prior to heating at highly elevated temperatures in order to assure the attainment of adequate physical properties in the fibrous graphite product.

In commonly assigned U.S. Ser. No. 45,160, filed concurrently herewith in the name of Michael J. Ram, is disclosed an improved graphitization process which overcomes many of the disadvantages associated with prior art attempts at the utilization of catalysis in the formation of graphite fibers. In such a process a continuous length of fibrous material capable of undergoing graphitization is continuously passed through a heating zone containing an inert gaseous atmosphere having a maximum temperature of at least about 2,000°C. while at least one gaseous stream containing a catalytic quantity of a volatile alkyl borate in vapor form capable of catalyzing the graphitization of the fibrous material is introduced into the heating zone.

It is an object of the invention to provide an improved graphitization process for the production of graphitic fibrous materials.

It is an object of the invention to provide a graphitization process which is capable of producing graphitic fibrous materials of superior tensile properties.

It is an object of the invention to provide a graphitization process which is capable of producing graphitic fibrous materials without sacrifice in tensile properties while reducing the maximum graphitization temperature as well as the accompanying power requirements.

It is an object of the invention to provide a graphitization process which is capable of producing graphitic fibrous materials while operating under conditions wherein the life of the apparatus utilized to carry out the process is substantially lengthened.

It is a further object of the invention to provide an improved graphitization process for the production of graphitic fibrous materials which is expeditiously carried out on a continuous basis.

These and other objects as well as the scope, nature, and utilization of the invention will be apparent from the following description and appended claims.

SUMMARY OF THE INVENTION

It has been found that in a process for the graphitization of a continuous length of a fibrous material capable of undergoing graphitization which is essentially free of boron comprising continuously passing the continuous length of fibrous material through a heating zone bounded by walls of graphitic carbon and containing an inert gaseous atmosphere having a maximum temperature of at least 2,000°C. until substantial graphitization occurs while preserving the original fibrous configuration essentially intact, that improved results are achieved by providing a boron compound capable of undergoing volatilization at a temperature below about 2000°C. in intimate association with the walls of graphitic carbon prior to introducing the continuous length of fibrous material into the heating zone thereby enabling the volatilization of a catalytic quantity of boron capable of catalyzing the graphitization of the fibrous material while being passed through the heating zone.

In a preferred embodiment of the process the precursor is a stabilized acrylic fibrous material and the heating zone is provided with a temperature gradient in which both carbonization and graphitization are carried out.

DESCRIPTION OF THE DRAWING

The drawing is a schematic illustration of a representative apparatus arrangement capable of carrying out the process of the present invention.

The continuous length of fibrous material utilized in the process of the present invention is capable of undergoing graphitization while retaining or preserving its original fibrous configuration essentially intact. The fibrous material undergoing graphitization in the process may be formed by conventional techniques and may be provided in a variety of physical configurations. For instance, the fibrous material may assume the configuration of a continuous length of a multifilament yarn, tape, tow, strand, cable, or similar fibrous assemblage. In a preferred embodiment of the invention the fibrous material is a continuous multifilament yarn.

The fibrous material which is treated in the present process optionally may be provided with a twist which tends to improve the handling characteristics. For instance, a twist of about 0.1 to 5 tpi, and preferably about 0.3 to 1.0 tpi may be imparted to a multifilament yarn. Also, a false twist may be used instead of or in addition to a real twist. Alternatively, one may select continuous bundles of fibrous material which possess essentially no twist.

The fibrous material which is graphitized in accordance with the present process may be carbonaceous, contain at least about 90 per cent carbon by weight, and exhibit an essentially amorphous x-ray diffraction pattern. As is known in the art, amorphous carbon fibrous materials suitable for graphitization may be formed by a variety of techniques. For instance, organic polymeric fibrous materials which are capable of undergoing thermal stabilization may be initially stabilized by treatment in an appropriate atmosphere at a moderate temperature (e.g. 200° to 400°C.), and subsequently heated in an inert atmosphere at a more highly elevated temperature, e.g. 900° to 1,000°C., or more, until a carbonized fibrous material is formed which exhibits an essentially amorphous x-ray diffraction pattern. The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g. oxygen and hydrogen) are substantially expelled. Suitable organic polymeric fibrous materials from which the fibrous material capable of undergoing graphitization may be derived include an acrylic polymer, a cellulosic polymer, a polyamide, a polybenzimidazole, polyvinyl alcohol, etc. As discussed hereafter, acrylic polymeric materials are particularly suited for use in the formation of the fibrous material capable of undergoing graphitization which is employed in the present process. Illustrative examples of suitable cellulosic materials include the natural and regenerated forms of cellulose, e.g. rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

A fibrous acrylic polymeric material prior to stabilization may be formed primarily of recurring acrylonitrile units. For instance, the acrylic polymer should contain not less than about 85 mol per cent of acrylonitrile units with not more than about 15 mol per cent of a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monovinyl compounds.

During the formation of a preferred carbonized starting material for use in the present process multifilament bundles of an acrylic fibrous material may be initially stabilized in an oxygen-containing atmosphere (i.e. preoxidized) on a continuous basis in accordance with the teachings of U.S. Ser. No. 749,957, filed Aug. 5, 1968, of Dagobert E. Stuetz, which is assigned to the same assignee as the instant invention and is herein incorporated by reference. More specifically, the acrylic fibrous material should be either an acrylonitrile homopolymer or an acrylonitrile copolymer which contains no more than about 5 mol per cent of one or more monovinyl comonomers copolymerized with acrylonitrile. In a particularly preferred embodiment of the invention the fibrous material is derived from an acrylonitrile homopolymer. The stabilized acrylic fibrous material which is preoxidized in an oxygen-containing atmosphere is black in appearance, contains a bound oxygen content of at least 7 per cent by weight as determined by the Unterzaucher analysis, retains its original fibrous configuration essentially intact, and is non-burning when subjected to an ordinary match flame.

In the present process a continuous length of the fibrous material capable of undergoing graphitization is continuously passed through a heating zone bounded by walls of graphitic carbon containing an inert gaseous atmosphere having a maximum temperature of at least 2,000°, e.g. a maximum temperature of 2,000° to 3,100°C. (preferably 2,400° to 3,100°C.), for a residence time sufficient to substantially convert the fibrous material to graphitic carbon while retaining its original fibrous configuration essentially intact. Suitable inert gaseous atmospheres for the heating zone include nitrogen, argon, helium, etc. For instance, a continuous length of an amorphous carbon fibrous material, e.g. a multifilament yarn may be passed through the heating zone while at a graphitization temperature of at least 2,000°C. for a residence time of about 5 seconds to 4 minutes to produce graphitization. Longer graphitization heating times may be selected but generally yield no commensurate advantage. Preferred residence times while within about 50°C. of the maximum graphitization temperature commonly range from about 10 seconds to 200 seconds.

In a preferred embodiment of the process a continuous length of a stabilized acrylic fibrous material which is non-burning when subjected to an ordinary match flame and derived from an acrylic fibrous material selected from the group consisting of an acrylonitrile homopolymer and acrylonitrile copolymers which contain at least about 85 mol per cent of acrylonitrile units and up to about 15 mol per cent of one or more monovinyl units copolymerized therewith is continuously passed through a heating zone bounded by walls of graphitic carbon containing an inert gaseous atmosphere and a temperature gradient in which said fibrous material is initially carbonized, and in which said carbonized fibrous material is heated to a maximum temperature of at least 2,000°C. until substantial graphitization occurs. Representative inert gaseous atmospheres for the heating zone in which both carbonization and graphitization are accomplished include nitrogen, argon, helium, etc.

When the fibrous material supplied to the heating zone is a stabilized acrylic fibrous material it may be carbonized and graphitized while passing through a temperature gradient within the heating zone in accordance with procedures described in commonly assigned U.S. Ser. Nos. 777,275, filed Nov. 20, 1968 of Charles M. Clarke entitled "Process for the Continuous Carbonization of a Stabilized Acrylic Fibrous Material"; Ser. No. 17,830 filed Mar. 9, 1970 of Charles M. Clarke, Michael J. Ram, and John P. Riggs entitled "Improved Process for the Carbonization of a Stabilized Acrylic Fibrous Material"; and Ser. No. 17,832 filed Mar. 9, 1970 of Charles M. Clarke, Michael J. Ram, and Arnold J. Rosenthal entitled "Production of High Tenacity Graphitic Fibrous Materials". Each of these disclosures is herein incorporated by reference.

In accordance with a particularly preferred embodiment of the process a continuous length of stabilized acrylic fibrous material which is non-burning when subjected to an ordinary match flame and derived from an acrylic fibrous material selected from the group consisting of an acrylonitrile homopolymer and acrylonitrile copolymers which contain at least about 85 mol per cent of acrylonitrile units and up to about 15 mol per cent of one or more monovinyl units copolymerized therewith is converted to a graphitic fibrous material while preserving the original fibrous configuration essentially intact while passing through a carbonization/graphitization heating zone bounded by walls of graphitic carbon containing an inert gaseous atmosphere and a temperature gradient in which the fibrous material is raised within a period of about 20 to about 300 seconds from about 800°C. to a temperature of about 1,600°C. to form a continuous length of carbonized fibrous material, and in which the carbonized fibrous material is subsequently raised from about 1,600°C. to a maximum temperature of at least about 2,400°C. within a period of about 3 to 300 seconds where it is maintained for about 10 seconds to about 200 seconds to form a continuous length of graphitic fibrous material.

The equipment utilized to produce the heating zone used to produce graphitization or carbonization and graphitization in the process of the present invention may be varied as will be apparent to those skilled in the art. It is essential that the apparatus selected be capable of producing the required temperature while excluding the presence of an oxidizing atmosphere.

In a preferred embodiment of the invention, the continuous length of fibrous material undergoing graphitization or carbonization and graphitization is heated by use of an induction furnace. In such a procedure the fibrous material may be passed in the direction of its length through a hollow graphite tube or other similarly shaped graphite susceptor which is situated within the windings of the induction coil. By varying the length of the graphite tube, the length of the induction coil, and the rate at which the fibrous material is passed through the graphite tube, many apparatus arrangements capable of carrying out the graphitization or carbonization and graphitization may be selected. For large scale production, it is of course preferred that relatively long graphite tubes or susceptors be used so that the fibrous material may be passed through the same at a more rapid rate while being graphitized or carbonized and graphitized. The temperature gradient of a given apparatus may be determined by conventional optical pyrometer measurements as will be apparent to those skilled in the art. The fibrous material because of its small mass and relatively large surface area instantaneously assumes essentially the same temperature as the inert gaseous atmosphere of the heating zone through which it is continuously passed.

During the formation of graphitic carbon within the continuous length of fibrous material a tensional force may be optionally applied to the bundles undergoing graphitization in order to provide efficient handling of the fibrous material and/or to modify the physical properties of the same.

During the graphitization reaction the inert gaseous atmosphere is commonly caused to flow through the heating zone while preserving the requisite heating. For instance, when an induction furnace is employed, the inert gaseous atmosphere may be continuously introduced through one or more small apertures provided in the wall of a hollow graphite tube which is surrounded by an induction coil. The inert gaseous atmosphere accordingly exits from the graphite tube through the ends thereof. The flow of the inert gaseous atmosphere out of each end of the graphite tube accordingly substantially excludes the introduction of air or an oxidizing atmosphere within the heating zone.

Prior to carrying out the graphitization or carbonization and graphitization process of the present invention a boron compound capable of undergoing volatilization at a temperature below about 2,000°C. is provided in intimate association with the walls of graphitic carbon which bound the heating zone. Accordingly when the temperature of the heating zone is raised to a temperature of 2,000°C. or above a catalytic quantity of boron capable of catalyzing the graphitization of the fibrous material is volatilized, becomes mingled with the inert gaseous atmosphere present in the heating zone, comes in contact with the continuous length of fibrous material passing through the heating zone, and catalyzes the graphitization of the fibrous material.

The technique employed to provide the boron compound in intimate association with the walls of the heating zone may be widely varied as will be apparent to those skilled in the art. Regardless of the technique employed the boron compound must be capable of undergoing volatilization upon the requisite heating. Such possibility for volatilization may be accomplished by providing the boron compound either directly upon or near the inner surface of the walls of the heating zone. Alternatively, the boron compound may be provided within the interior of the walls of graphitic carbon provided the porosity of the walls is such that the boron compound (or the decomposition products thereof) can find its way in vapor form to the inert gaseous atmosphere within the heating zone. By providing at least a portion of the boron compound within the interior of the walls of the heating zone a more gradual and prolonged release of the boron compound may be made possible. The term "volatilization" as used herein is defined in its broad sense and includes sublimation within its purview as well as passage from the liquid to the gaseous state.

The boron compound may be provided in intimate association with the graphitic carbon walls of the heating zone by applying a coating of the same which is at least partially absorbed by the graphitic carbon walls. For instance, if the boron compound is a liquid it may be simply painted upon the walls. Alternatively, if the boron compound is normally a solid it may be applied from a solution of the same dissolved in a suitable solvent. Also the boron compound may be applied from the gaseous phase at an elevated temperature. Another alternative is to immerse the graphitic carbon walls in a vessel containing the boron compound in either liquid form or as a solution dissolved in an appropriate solvent.

In a further embodiment the boron compound may be incorporated within the mass of carbonaceous material prior to the time it undergoes thermal treatment to form the graphitic carbon walls.

It has been found that a simple technique to modify the graphitic carbon walls of a previously formed heating zone so as to enable the subsequent practice of the present process is to continuously pass a continuous length of the starting fibrous material which has been impregnated with the boron compound through the heating zone while the heating zone is at an elevated temperature. The boron compound present upon the fibrous material can be expected to undergo volatilization within the heating zone and to become at least partially deposited upon the walls thereof where it is capable of again undergoing subsequent volatilization. After such deposit upon the graphitic carbon walls of the heating zone, one may next practice the present invention by bringing the heating zone to graphitization temperature and passing through the heating zone a continuous length of fibrous material which is capable of undergoing graphitization and which is essentially free of boron prior to its introduction into the heating zone.

The boron compound is provided in intimate association with the graphitic carbon walls of the heating zone in a quantity sufficient to enable the release of a catalytic quantity of boron under the graphitization conditions selected. Generally adequate catalysis of the graphitization reaction can be expected if boron is volatized into the inert gaseous atmosphere of the heating zone in a concentration of about 100 to 20,000 parts per million by volume (preferably 200 to 2,000 parts per million by volume). In a particularly preferred embodiment of the process the boron compound (or its decomposition products) is volatized from the graphitic carbon walls of the heating zone in a concentration of about 0.001 to 0.4 per cent by weight calculated upon the weight of boron per weight of fibrous material introduced into the heating zone.

In a particularly preferred embodiment of the present process the boron compound provided in intimate association with the graphitic carbon walls of the heating zone is boric acid ($H_3BO_3$) which is sometimes identified as boracic acid or orthoboric acid, or the dehydration products of boric acid, i.e. metaboric acid ($HBO_2$); pyroboric acid ($H_2B_4O_7$), and boric oxide ($B_2O_3$). As is well known, the dehydration of boric acid commonly occurs upon the heating zone of the same. The dehydration to boric oxide is preferably accomplished prior to carrying out the present process.

Alternatively, alkyl borates of the formula $B(OR)_3$ where R is an alkyl group having one to five carbon atoms may be selected. Such alkyl borates include: trimethyl borate, $B(OCH_3)_3$ sometimes identified as methyl borate, or trimethoxyborine; triethyl borate, $B(OC_2H_5)_3$; tripropyl borate, $B(OC_3H_7)_3$; triisopropyl borate, $B[O(CH_3)_2CH]_3$; tributyl borate, $B(OC_4H_9)_3$; and triamyl borate, $B(OC_5H_{11})_3$. The particularly preferred alkyl borate for use in the process is trimethyl borate.

Other representative boron compounds for use in the present process include higher molecular weight boric acid esters such as tricyclohexyl borate, $B(OC_6H_{11})_3$; tridodecyl borate, $B(OC_{12}H_{25})_3$; tri-m-cresyl borate, $B(OCH_3C_6H_4)_3$; tri-p-cresyl borate, $B(OCH_3C_6H_4)_3$; trihexylene glycol biborate, $B_2(O_2C_6H_{12})_3$; and tribenzyl borate, $B(OCH_2C_6H_5)_3$.

The volatilization of a catalytic quantity of boron within the heating zone described herein enables the graphitization of the fibrous material to proceed in a more efficient manner. Graphitic fibrous materials exhibiting improved tensile properties, such as Young's modulus as well as tensile strength, may be formed on a continuous basis in accordance with the present process without modification of the graphitization heating profile. Alternatively, through the use of the present process it is possible to decrease the maximum temperature experienced by the fibrous material within the heating zone while still achieving highly acceptable tensile properties within the resulting product.

The ability for one to operate at a lower maximum graphitization temperature offers a substantial cost reduction since less power is required and the usable life of the apparatus utilized in the process is extended. For instance, the graphite tube or susceptor of an induction furance may have its life extended many times (e.g. five to 10 times) by simply lowering the maximum graphitization temperature from about 2,900°C. to 2,700°C. Not only is one spared the cost of a replacement graphite tube, but down time is eliminated which would otherwise be consumed while replacing the graphite tube, starting up the furnace, and allowing it to again come to equilibrium conditions.

The following examples are given as specific illustrations of the invention. It should be understood, however, that the invention is not limited to the specific details set forth in the examples. Reference is made in the examples to the drawing.

EXAMPLE I

A continuous length of 1,600 fil unwashed dry spun acrylonitrile homopolymer continuous filament yarn having a total denier of 2,015 was selected as the starting material. The yarn was oriented and drawn to a single filament tenacity of about 3.2 grams per denier. The yarn was subjected to a healing treatment in which residual N,N-dimethyl formamide spinning solvent was evolved by passage for 6 minutes through a muffle furnace provided with air at 185°C. during which time the yarn shrank 10 per cent in length.

The yarn was stabilized on a continuous basis in the absence of shrinkage by passage for 155 minutes through a multi-wrap skewed roll oven provided with circulating air at 270°C. The stabilized (i.e. preoxidized) yarn was black in appearance, non-burning when subjected to an ordinary match flame, and had a bound oxygen content of about 11 per cent by weight as determined by the Unterzaucher analysis.

A portion of the stabilized yarn having a length of 200 meters was wound upon a perforated bobbin, and immersed for 24 hours in a 5 per cent by weight aqueous solution of boric acid which was provided at room temperature (i.e. about 25°C.). The soaked yarn which was impregnated with boric acid was rinsed with distilled water while still present upon the perforated bobbin. The yarn was next dried by standing in air at room temperature (i.e. at about 25°C.) for 24 hours, and then placed in a circulating air oven at 110°C. for 24 hours. While present within the circulating air oven, the boric acid in contact with the stabilized yarn was substantially converted to boric oxide.

The yarn was further dried by passing the direction of its length through a drying zone consisting of four 12 inch muffle furnaces (not shown) placed in an end to end relationship and provided with circulating air at 200°, 250°, 300°, and 340° respectively.

The boron impregnated dried yarn 1 was continuously passed from the series of four muffle furnaces (not shown) to an induction furnace 2 in which both carbonization and graphitization were accomplished. The yarn sample was passed through the induction furnace at a rate of 10 inches per minute in order to provide the graphitic carbon walls thereof in intimate association with a quantity of boron capable of catalyzing subsequent graphitization runs in which a continuous length of fibrous material which is essentially free of boron undergoes graphitization.

The induction furnace 2 comprised an Inductotherm model Inducto 50 unit provided with a 50 KW power source 4, a 12 turn water cooled copper coil 6 having a length of 19 inches, and a hollow graphite tube suspended within the coil having a total length of 55 inches. The copper coil 6 had an inner diameter of 8 inches, and the copper tubing from which it was formed was of 0.75 inch outer diameter with a wall thickness of 0.125 inch. The 55 inch hollow graphite tube was provided in two adjoining sections. The main section 8 was 45 inches in length, and had an outer diameter of 4 inches and an inner diameter of 0.75 inch. The auxiliary section 10 was 10 inches in length and was located at the exit end of the main section 8 and had an outer diameter of 2 inches and an inner diameter of 0.75 inch. The hollow graphite tube was held in position by supports 11. The copper coil 6 encompassed a portion of the main section 8 of the hollow graphite tube and had its end located 2 inches from the point were the main section 8 and the auxiliary 10 were joined. Carbon cloth insulation (not shown) in a depth of 2 inches totally surrounded the hollow graphite tube. An opening 12 having a diameter of 0.75 inch was provided in one side of the main section 8 of the hollow graphite tube. Also an opening was provided in the insulation which adjoined opening 12. A stream of nitrogen gas was introduced through the housing 14 and was generally directed toward the opening 12. Air was excluded from the hollow graphitic tube of the induction furnace by purging with the nitrogen flow which exited through openings 16 and 18 provided in housing 14. The boron impregnated yarn was raised to a maximum temperature of about 2,900°C. while passing through the induction furnace.

When passing through the heating zone defined by the walls of the hollow graphite tube at a rate of 10 inches per minute the yarn was raised to a temperature of 800°C. in approximately 48 seconds after entering the hollow graphite tube, from 800°C. to 1,600°C. in approximately 72 seconds, and from 1,600°C. to a maximum temperature of approximately 2,900°C. in approximately 60 seconds where it was maintained ±50° C. for approximately 48 seconds. Upon the removal of the graphite yarn 20 from the induction furnace the walls of hollow graphitic tube were in intimate association with a catalytic quantity of boron.

The process of the invention was next practiced by passing an identical sample of the stabilized acrylonitrile homopolymer yarn which had not been soaked in the aqueous solution of boric acid through the resulting induction furnace having a boron compound in intimate association with the walls of the hollow graphite tube in the identical manner as heretofore described. Following stabilization the yarn was stored in a forced air oven at 110°C. and was passed through a series of four muffle furnaces (not shown) as heretofore described. The stabilized yarn as it entered the heating zone of the induction furnace was essentially boron free. While passing through the heating zone constant longitudinal tensions of 100, 200, 300, 400, and 500 grams were maintained upon portions of the yarn at various points in time. The resulting yarn exhibited a graphitic carbon x-ray diffraction pattern and a specific gravity of about 2.0. No boron carbide was detected in the resulting graphite yarn by conventional x-ray diffraction studies. The following single filament tensile properties were obtained for the various graphite yarn samples.

| Tension in Grams | Tensile Strength | Young's Modulus |
| --- | --- | --- |
| 100 | $343 \times 10^3$ psi | $116 \times 10^6$ psi |
| 200 | $325 \times 10^3$ psi | $94 \times 10^6$ psi |
| 300 | $350 \times 10^3$ psi | $109 \times 10^6$ psi |
| 400 | $350 \times 10^3$ psi | $113 \times 10^6$ psi |
| 500 | $332 \times 10^3$ psi | $105 \times 10^6$ psi |

In a comparative graphitization procedure the above described Example I was repeated in the identical apparatus with the exception that the hollow graphite tube having a boron compound in intimate association with the walls thereof was replaced with another graphite tube which was not in intimate association with a catalytic quantity of boron and had never had a yarn which had been previously soaked in an aqueous boric acid passed through the same. The overall tensile properties of the resulting graphite yarn were generally lower than those obtained in Example I. The following single filament tensile properties were obtained for the various graphite yarn samples.

| Tension in Grams | Tensile Strength | Young's Modulus |
|---|---|---|
| 100 | 312 × 10³ psi | 96 × 10⁶ psi |
| 200 | 292 × 10³ psi | 90 × 10⁶ psi |
| 300 | 343 × 10³ psi | 98 × 10⁶ psi |
| 400 | 302 × 10³ psi | 96 × 10⁶ psi |
| 500 | 360 × 10³ psi | 98 × 10⁶ psi |

EXAMPLE II

Example I was repeated with the exception that a lesser maximum graphitization temperature was utilized and constant longitudinal tensions of 100, 200, 300, and 400 grams were maintained upon portions of the yarn at various points of time.

When passing through the heating zone of the resulting induction furnace having a boron compound in intimate association with the walls of the hollow graphite tube at a rate of 10 inches per minute, the yarn was raised to a temperature of 800°C. in approximately 48 seconds after entering the graphite tube, from 800° to 1,600°C. in approximately 72 seconds, and from 1,600°C. to a maximum temperature of approximately 2,700°C. in approximately 60 seconds where it was maintained ±50°C. for approximately 48 seconds.

The resulting yarn exhibited a graphitic carbon x-ray diffraction pattern and a specific gravity of about 2.0. No boron carbide was detected in the resulting graphite yarn by conventional x-ray diffraction studies. The following single filament tensile properties were obtained for the various graphite yarn samples.

| Tension in Grams | Tensile Strength | Young's Modulus |
|---|---|---|
| 100 | 332 × 10³ psi | 87 × 10⁶ psi |
| 200 | 337 × 10³ psi | 97 × 10⁶ psi |
| 300 | 366 × 10³ psi | 103 × 10⁶ psi |
| 400 | 348 × 10³ psi | 100 × 10⁶ psi |

In a comparative graphitization procedure the above-described Example II was repeated in the identical apparatus with the exception that the hollow graphite tube having a boron compound in intimate association with the walls thereof was replaced with a graphite tube which was not in intimate association with a catalytic quantity of boron and had never had a yarn which had been previously soaked in boric acid passed through the same. The resulting graphite yarn exhibited a specific gravity of about 1.95. The overall tensile properties of the resulting graphite yarn were generally lower than those obtained in Example II. The following single filament tensile properties were obtained for the various graphite yarn samples.

| Tension in Grams | Tensile Strength | Young's Modulus |
|---|---|---|
| 100 | 270 × 10³ psi | 69 × 10⁶ psi |
| 200 | 300 × 10³ psi | 80 × 10⁶ psi |
| 300 | 270 × 10³ psi | 72 × 10⁶ psi |
| 400 | 298 × 10³ psi | 72 × 10⁶ psi |

It will be noted that the tensile properties achieved in the process of Example II which operated at a lower maximum graphitization temperature (i.e. approximately 2700°C.) and employed a boron impregnated graphite tube were generally superior to the values achieved in the comparative graphitization procedure following Example I which operated at a higher maximum graphitization temperature (i.e. approximately 2,900°C.) in the absence of boron. By operating at a lower maximum graphitization temperature such as that employed in Examples II the useful life of the hollow graphite tube is substantially increased.

EXAMPLE III

Example I is repeated with the following exceptions.

The continuous length of continuous filament yarn which is introduced into the heating zone defined by the walls of the hollow graphite tube is a carbonaceous yarn derived from an acrylonitrile homopolymer containing about 99 per cent carbon by weight and exhibits an essentially amorphous x-ray diffraction pattern. Substantially similar results are achieved.

Although the invention has been described with preferred embodiments, it is to be understood that variations and modifications may be resorted to as will be apparent to those skilled in the art. Such variations are to be considered within the purview and scope of the claims appended hereto.

I claim:

1. In a process for the graphitization of a continuous length of fibrous material capable of undergoing graphitization which is essentially free of boron comprising continuously passing said continuous length of fibrous material in the direction of its length through a heating zone of a single induction furnace while said fibrous material is suspended within the confines of a hollow graphite susceptor containing an inert gaseous atmosphere having a maximum temperature of at least about 2,000°C. until substantial graphitization of said fibrous material occurs while preserving the original fibrous configuration essentially intact; the improvement of providing a boron compound capable of undergoing volatilization at a temperature below about 2,000°C. in intimate association with the walls of said hollow graphite susceptor prior to introducing said continuous length of fibrous material into said heating zone thereby enabling the volatilization of a catalytic quantity of boron capable of catalyzing said graphitization of said fibrous material while being passed through said heating zone.

2. A process according to claim 1 wherein said continuous length of fibrous material capable of undergoing graphitization is a carbonaceous fibrous material containing at least about 90 per cent carbon by weight and having an essentially amorphous x-ray diffraction pattern.

3. A process according to claim 1 wherein said continuous length of fibrous material is a continuous multifilament yarn.

4. A process according to claim 1 wherein said inert gaseous atmosphere is selected from the group consisting of nitrogen, argon, and helium.

5. A process according to claim 1 wherein said heating zone contains an inert gaseous atmosphere having a maximum temperature of about 2,400° to 3,100°C.

6. A process according to claim 1 wherein said boron compound is selected from the group consisting of boric acid and the dehydration products of boric acid.

7. In a process for converting a stabilized acrylic fibrous material which is essentially free of boron, non-burning when subjected to an ordinary match flame and derived from an acrylic fibrous material selected from the group consisting of an acrylonitrile homopolymer and acrylonitrile copolymers which contain at least about 85 mol per cent of acrylonitrile units and up to about 15 mol per cent of one or more monovinyl units copolymerized therewith to a graphitic fibrous material while preserving the original fibrous configuration essentially intact comprising continuously passing a continuous length of said fibrous material in the direction of its length through a heating zone of a single induction furnace while said fibrous material is suspended within the confines of a hollow graphite susceptor containing an inert gaseous atmosphere and a temperature gradient in which said fibrous material is initially carbonized, and in which said carbonized fibrous material is heated to a maximum temperature of at least 2,000°C. until substantial graphitization of said fibrous material occurs while preserving the original fibrous configuration essentially intact; the improvement of providing a boron compound capable of undergoing volatilization at a temperature below about 2,000° C. in intimate association with the walls of said hollow graphite susceptor prior to introducing said continuous length of fibrous material into said heating zone thereby enabling the volatilization of a catalytic quantity of boron capable of catalyzing said graphitization of said fibrous material while being passed through said heating zone.

8. A process according to claim 7 wherein said stabilized acrylic fibrous material exhibits a bound oxygen content of at least about 7 per cent by weight.

9. A process according to claim 7 wherein said stabilized acrylic fibrous material is derived an acrylonitrile homopolymer.

10. A process according to claim 7 wherein said stabilized acrylic fibrous material is derived from an acrylonitrile copolymer which contains at least about 95 mol per cent of acrylonitrile units and up to about 5 mol per cent of one or more monovinyl units copolymerized therewith.

11. A process according to claim 7 wherein said continuous length of stabilized acrylic fibrous material is a continuous multifilament yarn.

12. A process according to claim 7 wherein said inert gaseous atmosphere is selected from the group consisting of nitrogen, argon, and helium.

13. A process according to claim 7 wherein said carbonized fibrous material is heated in said inert gaseous atmosphere to a maximum temperature of about 2,400° to 3,100°C. until substantial graphitization occurs.

14. A process according to claim 7 wherein said boron compound is selected from the group consisting of boric acid and the dehydration products of boric acid.

15. In a process for converting a stabilized acrylic fibrous material which is essentially free of boron, non-burning when subjected to an ordinary match flame and derived from an acrylic fibrous material selected from the group consisting of an acrylonitrile homopolymer and acrylonitrile copolymers which contain at least about 85 mol per cent of acrylonitrile units and up to about 15 mol per cent of one or more monovinyl units copolymerized therewith to a graphitic fibrous material while preserving the original fibrous configuration essentially intact comprising continuously passing a continuous length of said fibrous material in the direction of its length through a heating zone of a single induction furnace while said fibrous material is suspended within the confines of a hollow graphite susceptor containing an inert gaseous atmosphere and a temperature gradient in which said fibrous material is raised within a period of about 20 to about 300 seconds from about 800°C. to a temperature of about 1,600°C. to form a continuous length of carbonized fibrous material, and in which said carbonized fibrous material is subsequently raised from 1,600°C. to a maximum temperature of at least about 2,400°C. within a period of about 3 to 300 seconds where it is maintained for about 10 seconds to about 200 seconds to form a continuous length of graphitic fibrous material; the improvement of providing a boron compound capable of undergoing volatilization at a temperature below about 2,000°C. in intimate association with the walls of said hollow susceptor prior to introducing said continuous length of fibrous material into said heating zone thereby enabling the volatilization of a catalytic quantity of boron capable of catalyzing said graphitization of said fibrous material while being passed through said heating zone.

16. A process according to claim 15 wherein said stabilized acrylic fibrous material exhibits a bound oxygen content of at least about 7 per cent by weight.

17. A process according to claim 15 wherein said stabilized acrylic fibrous material is derived from an acrylonitrile homopolymer.

18. A process according to claim 15 wherein said stabilized acrylic fibrous material is derived from an acrylonitrile copolymer which contains at least about 95 mol per cent of acrylonitrile units and up to about 5 mol per cent of one or more monovinyl units copolymerized therewith.

19. A process according to claim 15 wherein said continuous length of stabilized acrylic fibrous material is a continuous multifilament yarn.

20. A process according to claim 15 wherein said inert gaseous atmosphere is selected from the group consisting of nitrogen, argon, and helium.

21. A process according to claim 15 wherein said carbonized fibrous material is heated in said inert gaseous atmosphere to a maximum temperature of about 2,400° to 3,100°C. until substantial graphitization occurs.

22. A process according to claim 15 wherein said boron compound is selected from the group consisting of boric acid and the dehydration products of boric acid.

* * * * *